(12) United States Patent
Pearce et al.

(10) Patent No.: US 10,292,034 B2
(45) Date of Patent: May 14, 2019

(54) METHOD AND DEVICE FOR DISPATCHING DATA CARRIER DEVICES

(71) Applicant: MOTOROLA SOLUTIONS, INC., Chicago, IL (US)

(72) Inventors: Michael D. Pearce, Barrington, IL (US); Philip E. May, Palatine, IL (US); Trent J. Miller, West Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/680,408

(22) Filed: Aug. 18, 2017

(65) Prior Publication Data

US 2019/0058976 A1 Feb. 21, 2019

(51) Int. Cl.
*H04W 4/90* (2018.01)
*H04W 4/02* (2018.01)
*H04W 16/18* (2009.01)
*H04W 88/08* (2009.01)
*H04W 4/10* (2009.01)
*H04W 88/02* (2009.01)
*H04W 84/04* (2009.01)

(52) U.S. Cl.
CPC ............. *H04W 4/90* (2018.02); *H04W 4/023* (2013.01); *H04W 16/18* (2013.01); *H04W 4/10* (2013.01); *H04W 84/042* (2013.01); *H04W 88/02* (2013.01); *H04W 88/08* (2013.01)

(58) Field of Classification Search
CPC ......... H04W 4/90; H04W 4/023; H04W 4/22; H04W 16/18; H04W 4/10; H04W 84/042; H04W 88/02; H04W 88/08
See application file for complete search history.

(56) References Cited

U.S. PATENT DOCUMENTS

| | | | |
|---|---|---|---|
| 6,246,883 B1 * | 6/2001 | Lee | H04H 20/04 455/507 |
| 6,882,307 B1 | 4/2005 | Gifford | |
| 8,085,410 B1 | 12/2011 | Hargabus | |
| 8,314,683 B2 | 11/2012 | Pfeffer | |
| 8,966,560 B2 | 2/2015 | Tine et al. | |
| 9,271,311 B1 * | 2/2016 | Gurney | H04W 4/02 |
| 9,569,442 B2 * | 2/2017 | Caudle | G06F 17/30858 |
| 9,572,110 B1 * | 2/2017 | Serfaty | H04W 52/04 |
| 9,942,741 B2 * | 4/2018 | Amason | H04W 24/08 |

(Continued)

*Primary Examiner* — Mehmood B. Khan
(74) *Attorney, Agent, or Firm* — Perry + Currier, Inc.

(57) ABSTRACT

A method and device for dispatching data carrier devices is provided. The device comprises: a communication interface; and a controller. The controller is configured to: receive, using the communication interface, an incident report including a location of an associated incident; determine from the incident report: that the location has limited wireless coverage; and information that is to be transported to the location of the associated incident; identify a data carrier device that is capable of transporting the information to the location and is one or more of: presently storing at least a portion of the information; and capable of downloading any portion of the information that is not presently stored at the data carrier device; and transmit, using the communication interface, a dispatch command to the data carrier device to travel to the location; and an indication of the information to be transported to the location.

20 Claims, 12 Drawing Sheets

(56) References Cited

U.S. PATENT DOCUMENTS

| | | | |
|---|---|---|---|
| 2004/0023635 A1* | 2/2004 | Impson | H04L 12/66 455/404.1 |
| 2004/0043765 A1* | 3/2004 | Tolhurst | H04W 88/06 455/422.1 |
| 2006/0044965 A1* | 3/2006 | Butterfield | G11B 19/02 369/47.1 |
| 2008/0059236 A1* | 3/2008 | Cartier | G06Q 10/10 705/3 |
| 2009/0063234 A1* | 3/2009 | Refsland | G06Q 10/06 705/7.15 |
| 2009/0140923 A1* | 6/2009 | Graves | A61B 5/02055 342/450 |
| 2014/0372015 A1* | 12/2014 | Namm | H04W 4/046 701/117 |
| 2015/0141025 A1* | 5/2015 | Larsson | H04W 28/0226 455/448 |
| 2015/0208221 A1* | 7/2015 | Alazraki | H04W 4/90 455/404.1 |
| 2015/0254986 A1* | 9/2015 | Fairfield | G08G 1/22 707/687 |
| 2015/0281651 A1 | 10/2015 | Kaushik et al. | |
| 2015/0339921 A1* | 11/2015 | Hainzlmaier | G08G 1/096811 340/905 |
| 2016/0119766 A1* | 4/2016 | Chouhan | H04W 4/50 455/404.1 |
| 2016/0363457 A1* | 12/2016 | Jelavic | H04W 4/90 |
| 2016/0381541 A1* | 12/2016 | Akopian | H04W 4/70 455/404.1 |
| 2017/0161438 A1* | 6/2017 | Connery | G06Q 50/24 |
| 2017/0295501 A1* | 10/2017 | Wang | H04W 16/04 |
| 2017/0303108 A1* | 10/2017 | Amason | H04W 24/08 |
| 2017/0310815 A1* | 10/2017 | Ofir | H04M 1/72572 |
| 2017/0366935 A1* | 12/2017 | Ahmadzadeh | H04W 4/70 |
| 2018/0089460 A1* | 3/2018 | Kirk | G08B 25/016 |

\* cited by examiner

METHOD AND DEVICE FOR DISPATCHING DATA CARRIER DEVICES

BACKGROUND

It is important that first responders at incident scenes (e.g. forest fires, crime scenes in urban environments with tall buildings, etc.), have access to information. For example, when fighting a forest fire, having access to information about the forest fire and/or the region at which the forest fire is occurring, may assist firefighters with fighting the forest fire. Similarly, having access to information about a crime scene and/or criminal records related to the area where the crime scene has occurred, may assist police officers dispatched to the crime scene.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
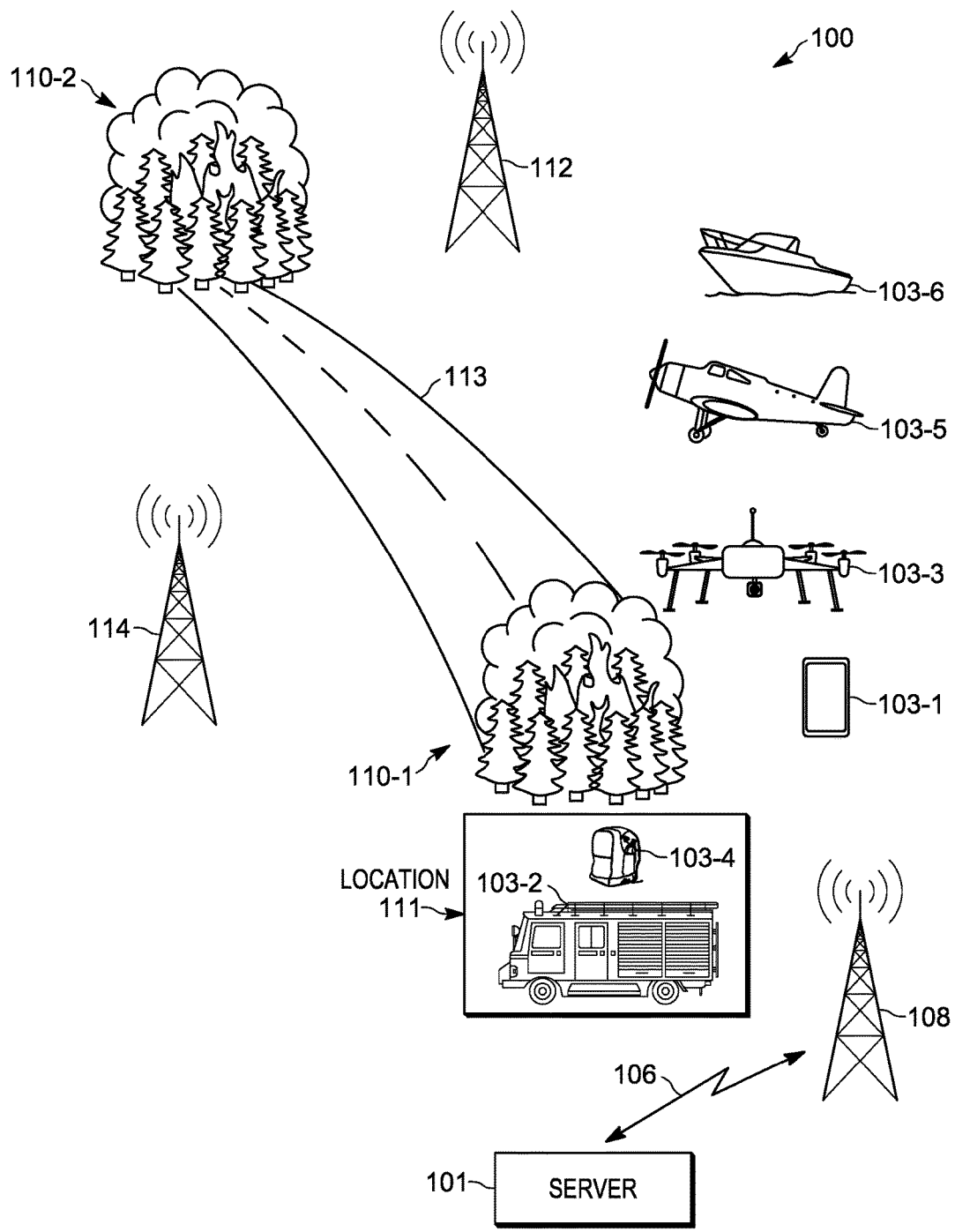
FIG. 1 depicts a system that includes a server for dispatching data carrier devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

First responder incident scenes (e.g. forest fires, crime scenes in urban environments with tall buildings, etc.), often have poor wireless connectivity, either between one another and/or with a dispatch center. However, multiple first responder incident scenes, some with limited wireless connectivity, may require data to be shared therebetween, for example at multiple locations in fighting a forest fire and/or data may be needed at any given incident scene with poor wireless connectivity. In the case of forest fires, such data may include weather conditions, wind direction, wind speed, microclimate, soil moisture, chemicals, materials, first responders at the incident scene, responder status, a fire perimeter, maps, and topography; in the case of crime scenes, such data may include criminal records related to the area (e.g. history of shootings and/or domestic disturbances in an area and/or at an address,) information about gang activity in an area (e.g. boundaries, types of weapons). However, when connectivity is poor and/or non-existents at an incident scene, sharing data between multiple disconnected incident scenes, and/or providing data to incident scenes with limited wireless connectivity, may be challenging to ensure that first responders at the incident scene with poor and/or no connectivity have the information needed to adequately respond.

An aspect of the specification provides a device comprising: a communication interface; and a controller configured to: receive, using the communication interface, an incident report including a location of an associated incident; determine from the incident report: that the location has limited wireless coverage; and information that is to be transported to the location of the associated incident; identify a data carrier device that is capable of transporting the information to the location and is one or more of: presently storing at least a portion of the information; and capable of downloading any portion of the information that is not presently stored at the data carrier device; and transmit, using the communication interface, a dispatch command to the data carrier device to travel to the location; and an indication of the information to be transported to the location.

An aspect of the specification provides a method comprising: receiving, at a controller, using a communication interface, an incident report including a location of an associated incident; determining, at the controller, from the incident report: that the location has limited wireless coverage; and information that is to be transported to the location of the associated incident; identifying, at the controller, a data carrier device that is capable of transporting the information to the location and is one or more of: presently storing at least a portion of the information; and capable of downloading any portion of the information that is not presently stored at the data carrier device; and transmitting, from the controller, using the communication interface, a dispatch command to the data carrier device to travel to the location; and an indication of the information to be transported to the location.

FIG. 1 is a block diagram of a system 100 that includes a server 101 in communication with one or more data carrier devices 103-1, 103-2, 103-3, 103-4, 103-5, 103-6, using one or more communication links 106 to each of the one or more data carrier devices 103-1, 103-2, 103-3, 103-4, 103-5, 103-6, via, for example, one or more wireless access points 108. The one or more data carrier devices 103-1, 103-2, 103-3, 103-4, 103-5, 103-6 will be interchangeably referred to hereafter, collectively, as devices 103, and generically as a device 103.

As depicted the devices 103 include various physical platforms, including, but not limited to, a wireless communication device 103-1, a vehicle device 103-2 (e.g. a firetruck), a drone device 103-3, a deployable backpack device 103-4, an aircraft device 103-5, and a boat device 103-6. However, any type of physical platform is within the scope of the present specification. As described in more detail below, each of the devices 103 are configured to communicate with the server 101 and are furthermore configured to retrieve and store information such that the information can be physically transported to a location having limited or no wireless connectivity using a device 103.

While six devices 103 are depicted, a number of the devices 103 may include as few as one device 103, but may include tens, hundreds and even thousands of devices 103 depending, for example, on a number of first responders and/or emergency responders being managed within the system 100 and/or by the server 101.

In some embodiments, a portion of the devices 103, regardless of their physical configuration, may generally comprise a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments including, but not limited to a deployable backpack which includes a mobile device. Furthermore, one or more of the devices 103, for example the devices 103-2, 103-3, 103-5, 103-6, include vehicles, and the like (for example emergency service vehicles), which in turn include a mobile device and/or a storage device therein, such as a radio, an emergency radio, a memory, a removable memory, a flash memory, and the like.

Indeed, in some embodiments, one or more of the devices 103 are specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

As depicted, the devices 103-1, 103-3, 103-5, 103-6 are located at a first location 110-1 of an associated incident, the first location 110-1 having wireless coverage using the one or more wireless communication access points 108. In addition, while the devices 103-1, 103-3, 103-5, 103-6 are each depicted as being located at the first location 110-1, one or more of the other devices 103-2, 103-4 may be located at locations other than the first location 110-1. For example, as depicted, the devices 103-2, 103-4 are located at another location 111, which may include, but is not limited to, device storage, a garage (e.g. associated with dispatch center), an airport, a marina, and the like.

As depicted, an associated incident at the first location 110-1 comprises a forest fire. As also depicted in FIG. 1, a second incident has occurred at a second location 110-2, the second incident that also comprises a forest fire. The location 110-1, 110-2 will be interchangeably referred to hereafter, collectively, as locations 110, and generically as a location 110. Each of the locations 110 may be related (e.g. locations from which to fight the same forest fire) or not related (e.g. locations from which to fight unrelated forest fires).

Furthermore, while example embodiments will be described herein with respect to forest fires, the other types of incident scenes to which first responders may be dispatched are within the scope of the present specification including, but not limited to, fires, house fires, crime scenes, accidents, and the like.

As depicted the location 110-2 has limited wireless coverage. For example a wireless access point 112 closest to the location 110-2 may not provide adequate wireless coverage of the location 110-2. In other words, the wireless access point 112 may provide poor wireless coverage (e.g. a weak signal), intermittent wireless coverage and/or no wireless coverage. Put another way, the location 110-2 has limited communication capacity and/or no communication capacity and/or a low rate (and/or a non-existent rate) at which information may be reliably transmitted over a communications channel.

However, as described herein, certain information may be required at the location 110-2 for first responders to adequately respond to the incident. Furthermore, as the wireless coverage at the location is limited, at least one device 103 may be dispatched to the location 110-2 (e.g. from the location 110-1 and/or the location 111) to physically transport the information to the location 110-2. In other words, as the information cannot be reliably transmitted to devices at the location 110-2, the information may be wirelessly retrieved by at least one device 103 and the at least one device 103 physically transported to the location 110-2 such that first responders at the location 110-2 may make use of the information. Such information may include, but is not limited to, data associated with the location 110-2, data associated with the incident report, weather at the location 110-2, wind direction at the location 110-2, wind speed at the location 110-2, a microclimate of the location 110-2, soil moisture at the location 110-2, chemicals at the location 110-2, materials at the location 110-2, personnel (e.g. first responders) at the location 110-2, status of the personnel at the location, a fire perimeter at the location 110-2, a map of the location 110-2, topography of the location 110-2, criminal data associated with the location 110-2, and the like. In yet further embodiments, such information may include, but is not limited to, data associated with different incident types; for example, data associated with crime scenes at the location 110-2 can be transported to the location 110-2 such that firefighters at the location 110-2 are aware of crimes in area of the location 110-2. In yet further embodiments, such information may include, but is not limited to, commands and/or directives to be implemented at the location 110-2 (e.g. instructions on who is to lead a firefighting team, and the like, instructions on how to fight a fire, and the like) and/or status of personnel (e.g. first responders) at another location (such as the location 110-1).

As depicted, the system 100 includes at least one physical transportation path 113 (interchangeably referred to as the path 113) between the locations 110, and/or between the locations 110-2, 111, the path 113 including, but not limited to, one or more of a road, a body of water, a flight path, and the like, depending on how a device 103 transports information to the location 110-2.

Furthermore wireless coverage may be at least partially provided along the path 113 by one or more wireless access points 114. Hence, the at least one device 103 may retrieve the information to be physically transported to the location 110-2 prior to being physically transported to the location 110-2 and/or during the physical transportation of the one or more of the devices 103 to the location 110-2 (e.g. using the one or more wireless access points 114).

Each of the wireless access points 108, 112, 114 may comprise a cell phone tower and/or cell phone antenna, and/or a radio tower and/or radio antenna, which wireless relays data between the server 101 and the devices 103. However, one or more of the wireless access points 108, 112, 114 may comprise a WiFi access point, and the like. Indeed, each of the wireless access points 108, 112, 114 comprise any suitable access point for wirelessly communicating with the devices 103.

In specific embodiments, the server 101 comprises a server and/or components of a computer aided dispatch (CAD) center and/or a command center, including, but not limited to, an emergency dispatch center used to communicate with first responders and/or emergency responders, and hence the server 101 comprises a server device and/or a communication device configured to dispatch at least device 103 to the location 110-2 as well as cause the at least one device 103 to retrieve information to be physically transported to the location 110-2.

Figure 2:
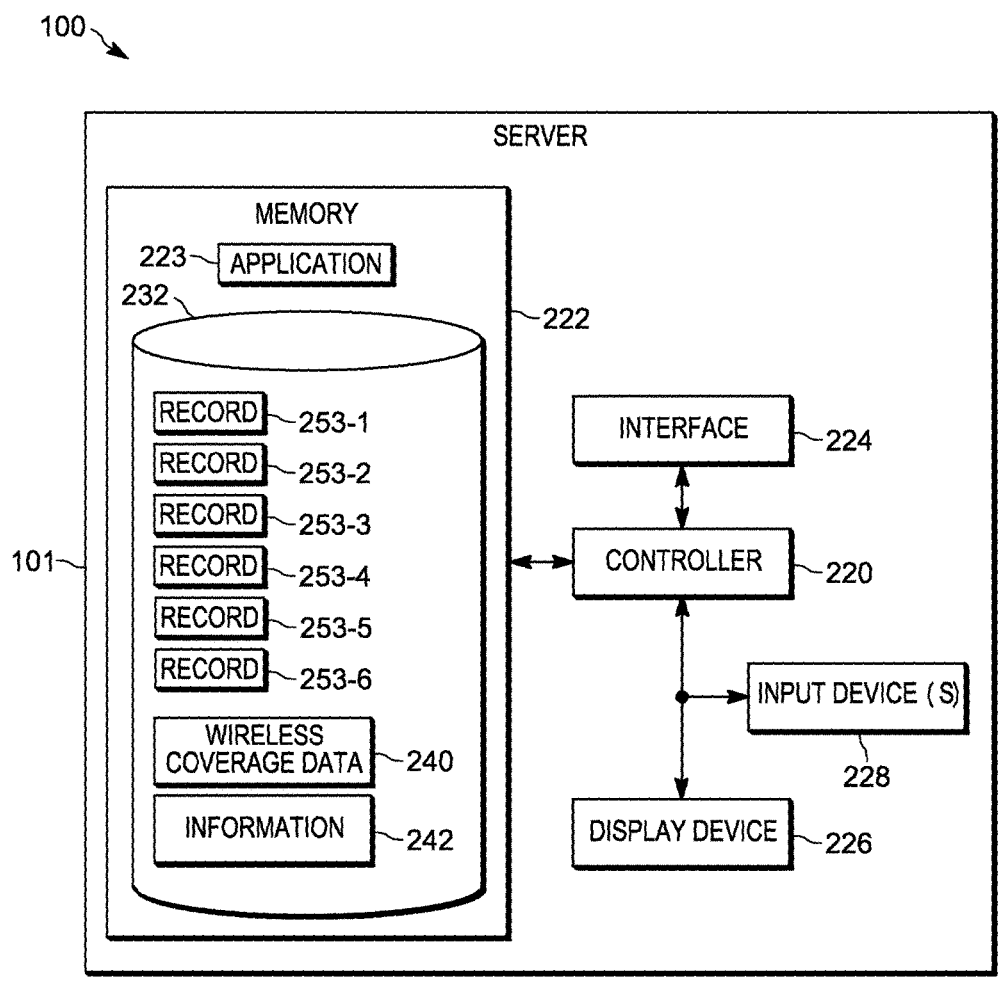
FIG. 2 depicts a block diagram of a server for dispatching data carrier devices in accordance with some embodiments.

Attention is next directed to FIG. 2 which depicts a block diagram of the server 101. The server 101 comprises: a controller 220, a memory 222, storing an application 223, and a communication interface 224, interchangeably referred to hereafter as the interface 224, and optionally a display device 226 and at least one input device 228. The controller 220 is generally configured for communication with the devices 103, using the communication interface 224.

As described in detail below, the controller 220 is generally configured to: receive, using the communication interface 224, an incident report including a location 110-2 of an associated incident; determine from the incident report: that the location 110-2 has limited wireless coverage; and information that is to be transported to the location of the associated incident; identify a data carrier device 103 that is capable of transporting the information to the location and is one or more of: presently storing at least a portion of the information; and capable of obtaining (e.g. by downloading) and storing any portion of the information that is not presently stored at the data carrier device 103; and transmit, using the communication interface 224, a dispatch command to the data carrier device 103 to travel to the location 110-2; and an indication of the information to be transported to the location 110-2.

The controller 220 includes one or more logic circuits, one or more processors, one or more microprocessors, one or more ASIC (application-specific integrated circuits) and one or more FPGA (field-programmable gate arrays). In some embodiments, the controller 220 is not a generic controller and/or a generic device, but a device specifically configured to implement data carrier device dispatch functionality. For example, in some embodiments, the server 101 and/or the controller 220 specifically comprises a computer executable engine configured to implement specific data carrier device dispatch functionality.

The memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 2, programming instructions (e.g., machine readable instructions) that implement the functional teachings of the server 101 as described herein are maintained, persistently, at the memory 222 and used by the controller 220 which makes appropriate utilization of volatile storage during the execution of such programming instructions.

In particular, the memory 222 of FIG. 1 stores instructions corresponding to the application 223 that, when executed by the controller 220, enables the controller 220 to implement data carrier device dispatch functionality associated with the application 223. In the illustrated example, when the controller 220 executes the application 223, the controller 220 is enabled to: receive, using the communication interface 224, an incident report including a location 110-2 of an associated incident; determine from the incident report: that the location 110-2 has limited wireless coverage; and information that is to be transported to the location of the associated incident; identify a data carrier device 103 that is capable of transporting the information to the location and is one or more of: presently storing at least a portion of the information; and capable of downloading any portion of the information that is not presently stored at the data carrier device 103; and transmit, using the communication interface 224, a dispatch command to the data carrier device 103 to travel to the location 110-2; and an indication of the information to be transported to the location 110-2.

As depicted, the memory 222 further stores a database 232 that includes wireless coverage data 240 indicative wireless coverage of at least the location 110-2 and optionally the location 110-1 and/or the path 113. The wireless coverage data 240 may comprise a wireless coverage map of a region that includes the location 110-2 and optionally the location 110-1 and/or the path 113. The wireless coverage data 240 may be provisioned at the database 232 by requesting (e.g. periodically) the wireless coverage data 240 from a wireless service provider, and the like.

As depicted, the database 232 further stores information 242 to be transported to the location 110-2. The information 242 may be a subset of information available to be transported the location 110-2, and may include a database of information related to first responder incident types indexed, for example, by location. The information 242 may further include information acquired at an incident scene, such as location 110-1; for example, the devices 103-1, 103-3, 103-5, 103-6 may collect information related to the forest fire at the location 110-1 and/or forest fires in general and transmit the collected information to the server 101 for storage at the database 232 (and/or any other device maintaining the database 232. For example the drone device 103-3 may be configured to acquire heatmaps of the location 110-1 (and/or the location 110-2, depending on a distance therebetween and/or range of the drone 103-3) and transmit the heatmaps to the server 101, and the like. The information 242 may alternatively be generically associated with a given type of incident, for example generic information related to fires or any other type of incident scene. Furthermore, the information 242 may be indexed according to one or more of location, geographic features, weather, users on-scene, equipment on-scene, type of incident, and the like.

However, the information 242 may include an indication of information to be transported to the location 110-2 without the information associated with the indication. For example, the information 242 may not include a current ambient temperature (e.g. as measurable using sensors at one or more of the devices 103), but the information 242 may indicate types of information that may be acquired by the devices 103 for transport to the location 110-2 that may be acquired, for example, by sensors at a device 103.

As depicted, the database 232 further stores records 253-1, 253-2, 253-3, 253-4, 253-5, 253-6, interchangeably referred to hereafter, collectively, as records 253 and, generically, as a data record 253. Each record 253 stores data associated with a respective device 103 (e.g. one record 253 for each device 103, for example the record 253-1 stores data associated with the device 103-1, etc.), as described in more detail below, including, but not limited to capabilities of the devices 103, a current location of each of the devices 103, information stored at each of the devices 103, and the like.

In some embodiments, at least a portion of the database 232 is not stored at the memory 222 and/or at the server 101, but at a memory external to the server 101 that is accessible to the controller 220.

The interface 224 is generally configured to communicate with the devices 103 using wired and/or wireless links 106 as desired, including, but not limited to, cables, WiFi links and the like. In other words, the links 106 may include any suitable combination of wired networks and/or wireless networks. In some embodiments, the interface 224 is further configured to communicate with the one or more device 103, for example, using one or more communication channels over the links 106. In these embodiments, the interface is implemented by, for example, one or more radios and/or connectors and/or network adaptors, configured to communicate wirelessly, with network architecture that is used to implement one or more communication channels between the server 101 and the devices 103 and/or a wireless network (that may include the wireless access points 108, 112, 114). In these embodiments, the interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interface 224 includes one or more local area network or personal area network transceivers operating in accordance with an IEEE 902.11 standard (e.g., 902.11a, 902.11b, 902.11g), or a Bluetooth™ transceiver which may be used to communicate with the devices 103 (e.g. assuming that one or more of the devices 103 are within range of such a local area network or personal area network tranceiver). In some embodiments, the interface 224 is further configured to communicate "radio-to-radio" on some communication channels (e.g. in embodiments where the interface 224 includes a radio), while other communication channels are configured to use wireless network infrastructure.

Example communication channels over which the interface 224 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

However, in other embodiments, the interface 224 communicates with the one or more devices 103 using other servers and/or communication devices, for example by communicating with the other servers and/or communication devices using, for example, packet-based and/or internet protocol communications, and the like, and the other servers and/or communication devices use radio communications to wirelessly communicate with the one or more devices 103.

Indeed, communication between the server 101 and the devices 103 may further include any suitable combination of wired networks and/or wireless networks. In other words, the link 106 may include any suitable combination of wired networks and/or wireless networks.

The optional display device 226 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). The optional input device 228 comprises any suitable one of, or combination of keyboards, pointing devices, touchpads, touchscreens, buttons, and the like. Furthermore, when present, one or more of the display device 226 and the input device 228 may be external to the server 101 and accessible to the server 101 via the interface 224; for example, the display device 226 and/or the input device 228 may be components of one or more operator terminals (not depicted) used by one or more operators (not depicted) in a computer aided dispatch center.

In any event, it should be understood that a wide variety of configurations for the server 101 are within the scope of present embodiments.

Figure 3:
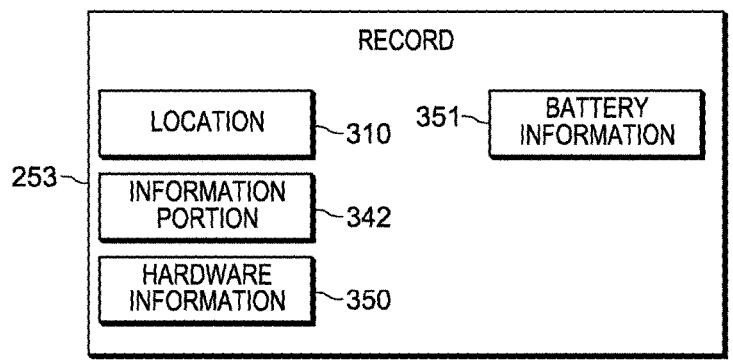
FIG. 3 depicts an example of a record for a data carrier device that may be stored at a database of the server of FIG. 2 in accordance with some embodiments.

Attention is next directed to FIG. 3 which depicts an example embodiment of a record 253. As depicted the record 253 stores data which includes, but is not limited to, a current location 310 of a respective device 103 (e.g. geographic coordinates of the location 110-1 or the location 111, or any other location where the respective device 103 is located), an indication 342 of a portion of the information 242 stored at the respective device 103, hardware information 350 of the respective device 103 and a battery information 351 of the respective device 103.

The current location 310 may be determined by querying the respective device 103 (e.g. in a pull operation) and receiving a location thereof, and/or using triangulation techniques, and the like. Indeed, the devices 103 may be configured to transmit (e.g. in a push operation) a respective current location to the server 101 periodically (and/or to any device maintaining records 253).

The indication 342 of a portion of the information 242 stored at the respective device 103 may include a record of all information stored at the respective device 103 as periodically received by the respective device 103 (e.g. a push operation and/or a pull operation). However, in other embodiments, all information stored at the respective device 103 is transmitted to the respective device 103 by the server 101 (and/or another device maintaining the records 253) and the server 101, and the like, maintains the indication 342 of a portion of the information 242 accordingly. Either way, the indication 342 of a portion of the information 242 indicates what portion of the information 242 to be physically transported to the location 110-2 is stored at the respective device 103.

In other embodiments, however, the indication 342 of a portion of the information 242 is optional. In these implementations, the controller 220 of the server 101 may query a device 103 to determine information stored thereupon.

The hardware information 350 is indicative of the hardware at the respective device 103 and hence is generally indicative of the capabilities of the respective device 103. For example, the hardware information 350 may include an indication of available memory of the respective device 103, the communication capability of a respective communication interface of the respective device 103, a device bandwidth of the respective device 103 (for example of a communication interface), a type of communication interface of the respective device 103, sensors available to the respective device 103, a processor speed of the respective device 103, and the like, as well as a physical platform of the respective device 103 (e.g. a vehicle, a wireless communication device, a boat, an aircraft etc.). The hardware information 350 may be stored in the record 253 upon deployment of the respective device 103 in the system 100, for example, by an administrator of the system 100 and/or the server 101.

As depicted, the record 253 further includes battery information 351 of the respective device 103, for example a current battery state of a battery of the respective device 103, such as a percent current charge state, a current operating life of the respective device 103 given the percent current charge state, and the like. The battery information 351 may be updated based on information received from the respective device 103 in a push operation and/or a pull operation similar to the current location 310.

Indeed, the record 253 may store any other data associated with the respective device 103.

Figure 4:
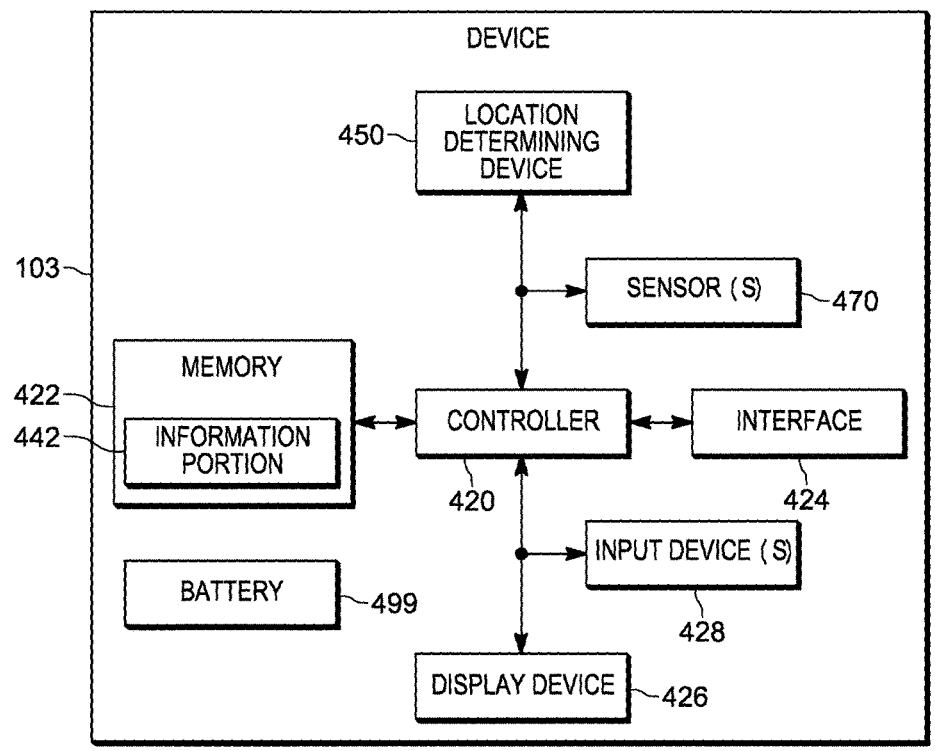
FIG. 4 depicts a block diagram of a data carrier device in accordance with some embodiments.

Attention is next directed to FIG. 4 which depicts a block diagram of a device 103. As depicted each device 103 comprises a controller 420, a memory 422 and a communication interface 424 (interchangeably referred to as the interface 424), as well as an optional display device 426 and at least one input device 428. The controller 420, the memory 422 the interface 424, the display device 426 and the input device 428 are each respectively similar to the controller 220, the memory 222 the interface 224, the display device 226 and the input device 228 of the server 101, adapted, however, for the respective platform of the respective device 103.

As depicted, the device 103 further includes a location determining device 450, including, but not limited to, one or more of a Global Positioning System (GPS) device, a Globalnaya Navigazionnaya Sputnikovaya Sistema (GLONASS) device, a triangulation device, and the like. As depicted, the device 103 further includes a battery 499, and the like, configured to power the components of the device 103.

As depicted, the device 103 further includes one or more sensors 470 that may be used to acquire information that is to be transported to the location 110-2, including, but not limited to camera devices, weather sensors, wind sensors, temperature sensors, and the like. For example, when the device 103 comprises a drone, a camera device may be used to acquire aerial maps of locations.

As depicted, the memory 422 stores an information portion 442 comprising a portion of the information 242 stored at the database 232 to be physically transported to the location 110-2. The information portion 442 may include information acquired at an incident scene, such as location 110-1 and/or information related to a given type of incident, for example generic information related to fires or any other type of incident scene. Furthermore, the memory 422 may include a removable memory, including, but not limited to, a flash drive and the like.

The controller 420 is generally configured to communicate with the server 101, and the like, to both receive dispatch commands, and to provide the server with a respective current location (e.g. as determined using the location determining device 450), a battery state, indications of the information portion 442 (e.g. an indication of what information is stored at the memory 422), a current memory capacity (e.g. a portion of the memory 422 available to store further information) and the like.

Figure 5:
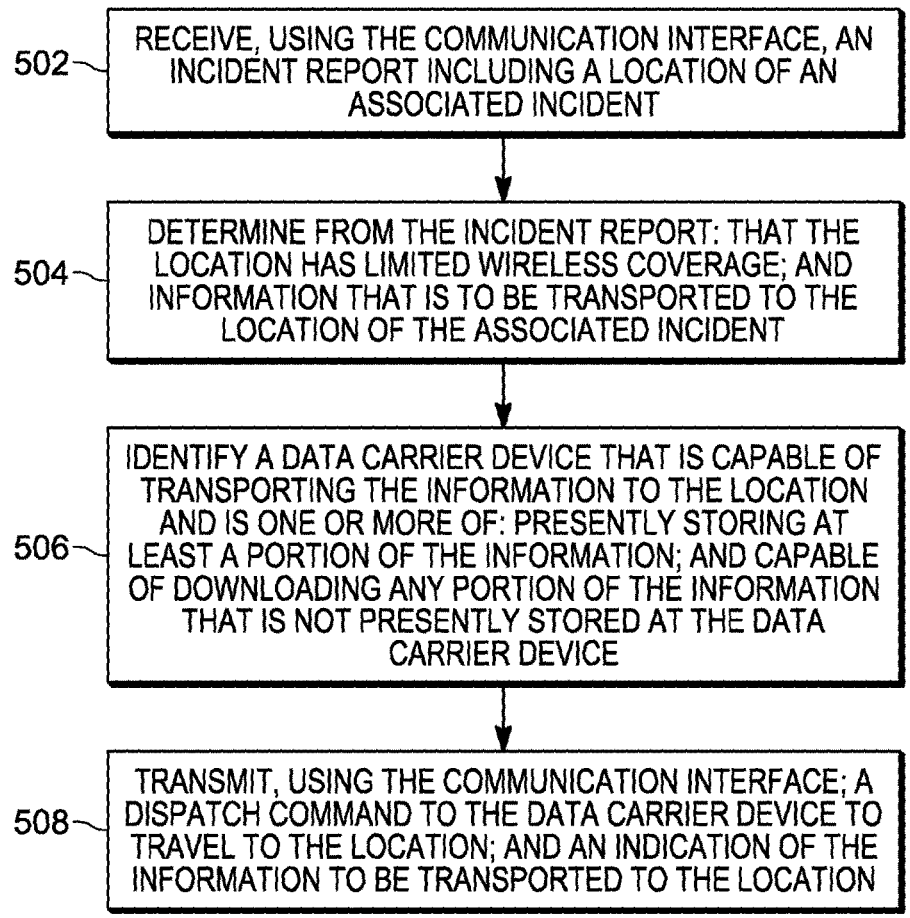
FIG. 5 is a flowchart of a method of dispatching data carrier devices in accordance with some embodiments.

Attention is now directed to FIG. 5 which depicts a flowchart representative of a method 500 for dispatching data carrier devices. In some embodiments, the operations of the method 500 of FIG. 5 correspond to machine readable instructions that are executed by, for example, the server 101 of FIG. 1, and specifically by the controller 220 of the server 101. In the illustrated example, the instructions represented by the blocks of FIG. 5 are stored at the memory 222, for example, as the application 223. The method 500 of FIG. 1 is one way in which the server 101 and/or the controller 220 is configured. Furthermore, the following discussion of the method 500 of FIG. 5 will lead to a further understanding of the server 101, and its various components.

However, it is to be understood that the server 101 and/or the controller 220 and/or the method 500 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

At a block 502, the controller 220 receives, using the communication interface 224, an incident report including a location 110-2 of an associated incident.

At a block 504, the controller 220 determines from the incident report: that the location 110-2 has limited wireless coverage; and information that is to be transported to the location of the associated incident.

At a block 506, the controller 220 identifies a data carrier device 103 that is capable of transporting the information to the location and is one or more of: presently storing at least a portion of the information; and capable of downloading any portion of the information that is not presently stored at the data carrier device 103.

At a block 508, the controller 220 transmits, using the communication interface 224, a dispatch command to the data carrier device 103 to travel to the location 110-2; and an indication of the information to be transported to the location 110-2.

The method 500 will now be described with reference to FIG. 6 to FIG. 13.

Figure 6:
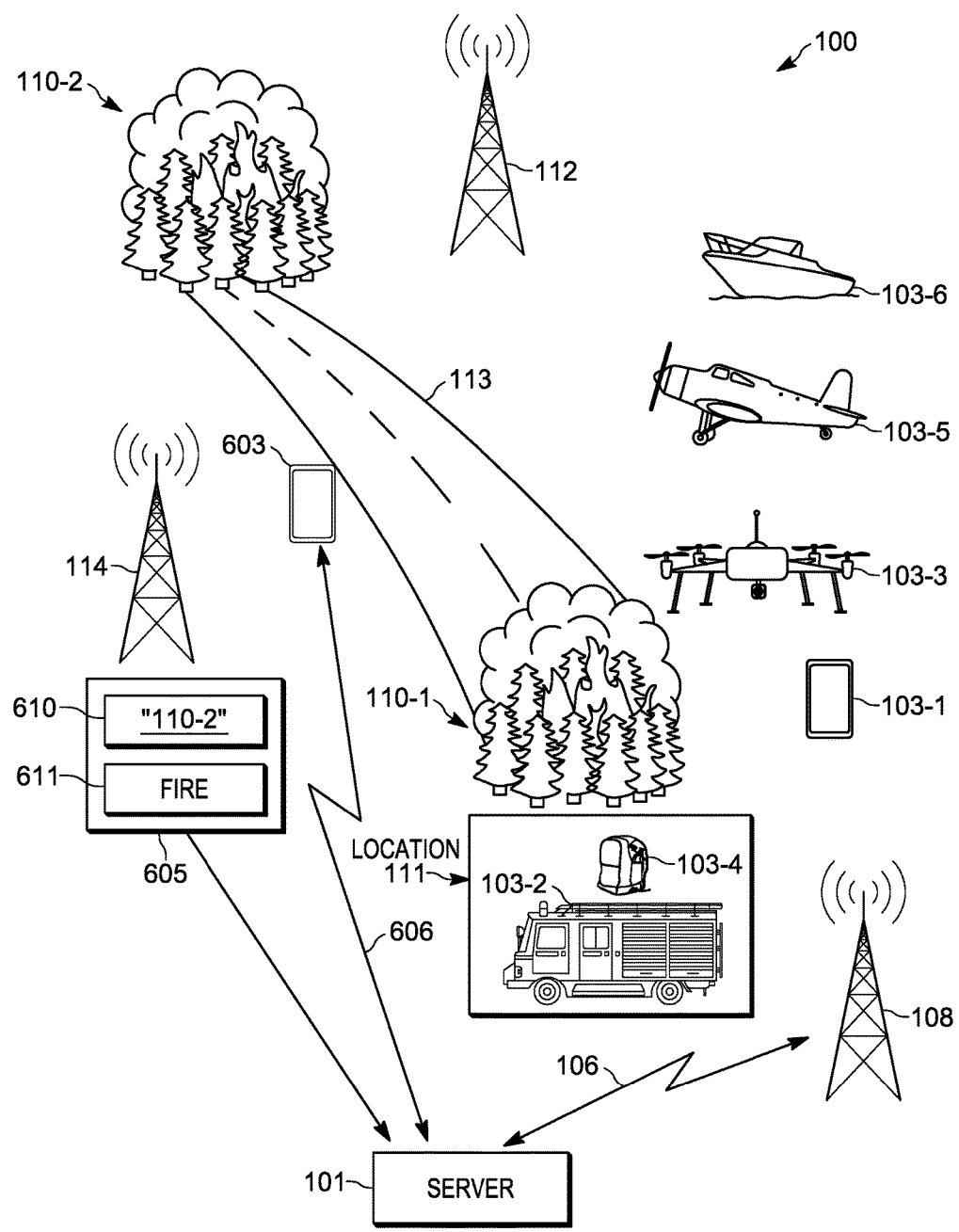
FIG. 6 depicts an incident report being received at the server in the system of FIG. 1 in accordance with some embodiments.

Attention is next directed to FIG. 6 which is substantially similar to FIG. 1, with like elements having like numbers. However, in FIG. 6, a wireless communication device 603

(e.g. similar to the device 103-1) located on the path 113 is transmitting an incident report 605 to the server 101, for example using a communication link 606 (e.g. similar to the link 106) to the server 101 (e.g. via the wireless access point 114).

The incident report 605 includes at least a location 610 of an associated incident, for example data "110-2" indicative of the location 110-2, the data "110-2" comprising geographic coordinates, for example, of the location 110-2. As depicted, the incident report 605 includes an indication 611 of the information that is to be transported to the location 610 including, but not limited to a type of incident at the location 610 indicated in the incident report 605, as depicted text indicating a "Fire". However, the indication 611 could specifically indicate what information is being requested for the location 610, such as weather data, and the like, and/or any other information that could be used by first responders to respond to the associated incident.

Hence, for example, a user of the device 603 may be a first responder reporting a fire, or any other incident, at the location 110-2, who has travelled along the path 113 with the device 603 until finding a signal using the wireless access point 114 (e.g. as when at the location 110-2, there was limited wireless coverage). The first responder reports the fire at the location 110-2 by transmitting the incident report 605 to the server 101 using, for example an application and/or one or more forms at the device 603.

The server 101 hence receives the incident report 605 (e.g. at the block 502 of the method 500) via the wireless access point 114, the link 606, and the interface 224.

Figure 7:
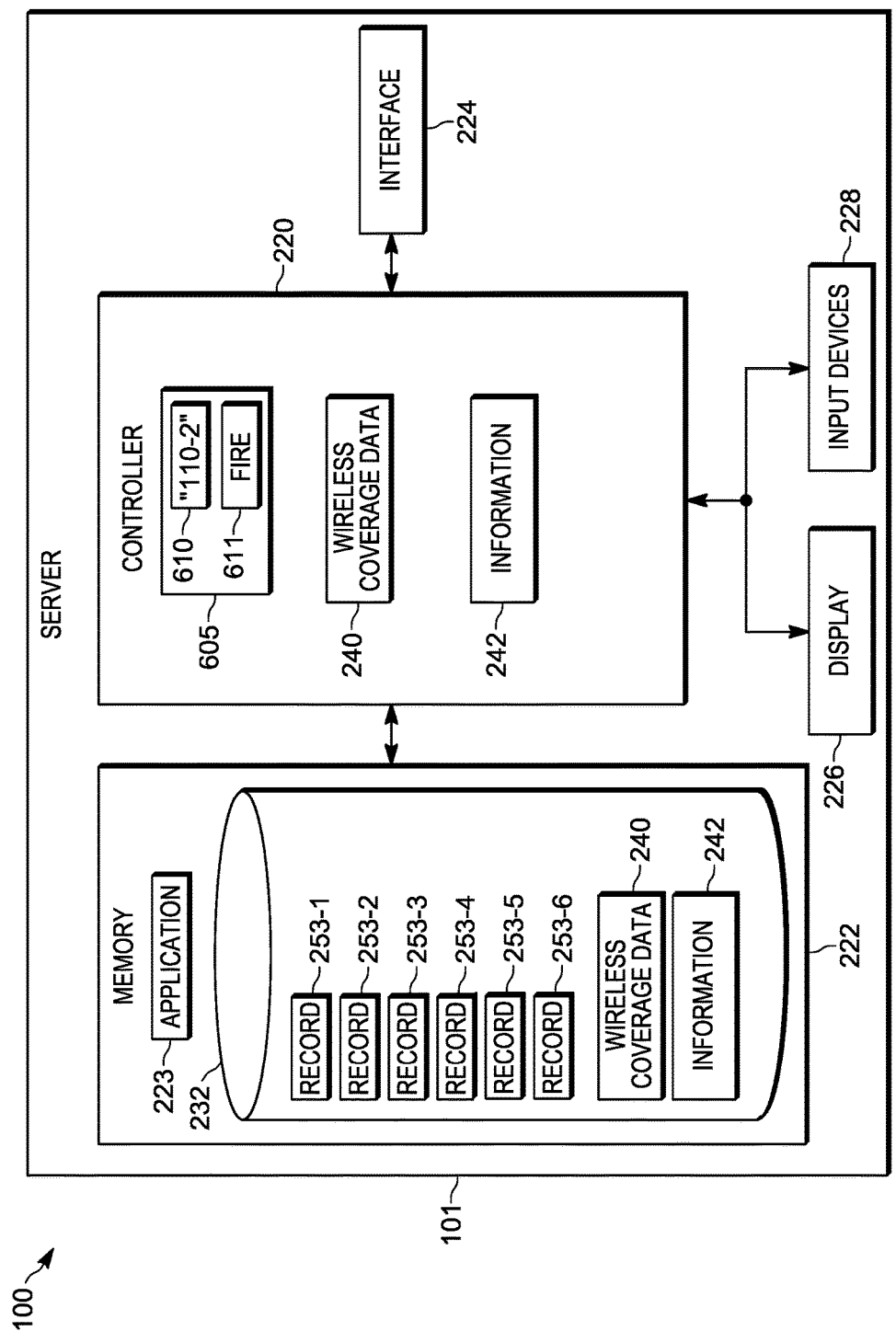
FIG. 7 depicts the server determining that a location identified in the incident report has limited wireless coverage in accordance with some embodiments.

Attention is next directed to FIG. 7, which is substantially similar to FIG. 2, with like elements having like numbers. At FIG. 7, the controller 220 is comparing the incident report 605 with data retrieved from the database 232. For example, the location 610 is compared with the wireless coverage data 240 to determine (e.g. at the block 504 of the method 500) that the location 610 (e.g. that corresponds to the location 110-2) received in the incident report 605 has limited wireless coverage as described above. As such the information 242 cannot be wirelessly transmitted to devices at the location 610 (e.g. the location 110-2).

Furthermore, as depicted, the controller 220 may determine from the incident report 605 that the information 242 is to be transported to the location 610 of an associated incident. In some embodiments the type of information may be determined from the location 610. For example, the location 610 indicates that an incident is occurring at the location 110-2, which may be in a forest, as determined using map data (not depicted), stored in the memory 222 and/or the database 232; hence the controller 220 may determine that the associated incident is a fire as no other type of incident is associated with such location types.

Similarly, a record 253 of the device 603 may indicate that the device 603 is associated with a first responder who is a fire fighter and hence all locations received in incident reports from the device 603 are associated with fires (e.g. a record associated with a device may indicate a first responder type, and the information that is to be transported to a location of an associated incident is determined from the first responder type, for example a fire fighter, a police officer, a paramedic, and the like).

In any event, as depicted, the controller 220 determines (e.g. at the block 504 of the method 500) from the incident report 605 (and specifically from the indication 611 and/or specific information 242 requested using the indication 611), that the information 242 associated with fighting fires is to be physically transported to the location 110-2 (e.g. as received as the location 610).

Furthermore, the controller 220 may determine a type of information and/or category of information and/or specific information that is to be transported to the location 110-2. For example, while it is assumed herein that the such a determination has already occurred and that the information 242 is the information to be transported to the location 110-2, the controller 220 may select the information 242 from a larger body of information stored at the database 232 (e.g. using an index of the database 232) based on data in the incident report 605 such that the information 242 includes, but is not to, geographic features of the location 110-2, weather of the location 110-2, users on-scene of the location 110-2, equipment on-scene of the location 110-2, type of incident at the location 110-2, and the like.

While FIG. 7 depicts the information 242 loaded at the controller 220, the controller 220 may alternatively identify a location of the information (e.g. at the database 232) using an index of the database 232 and the like, rather than load the information 242.

Figure 8:
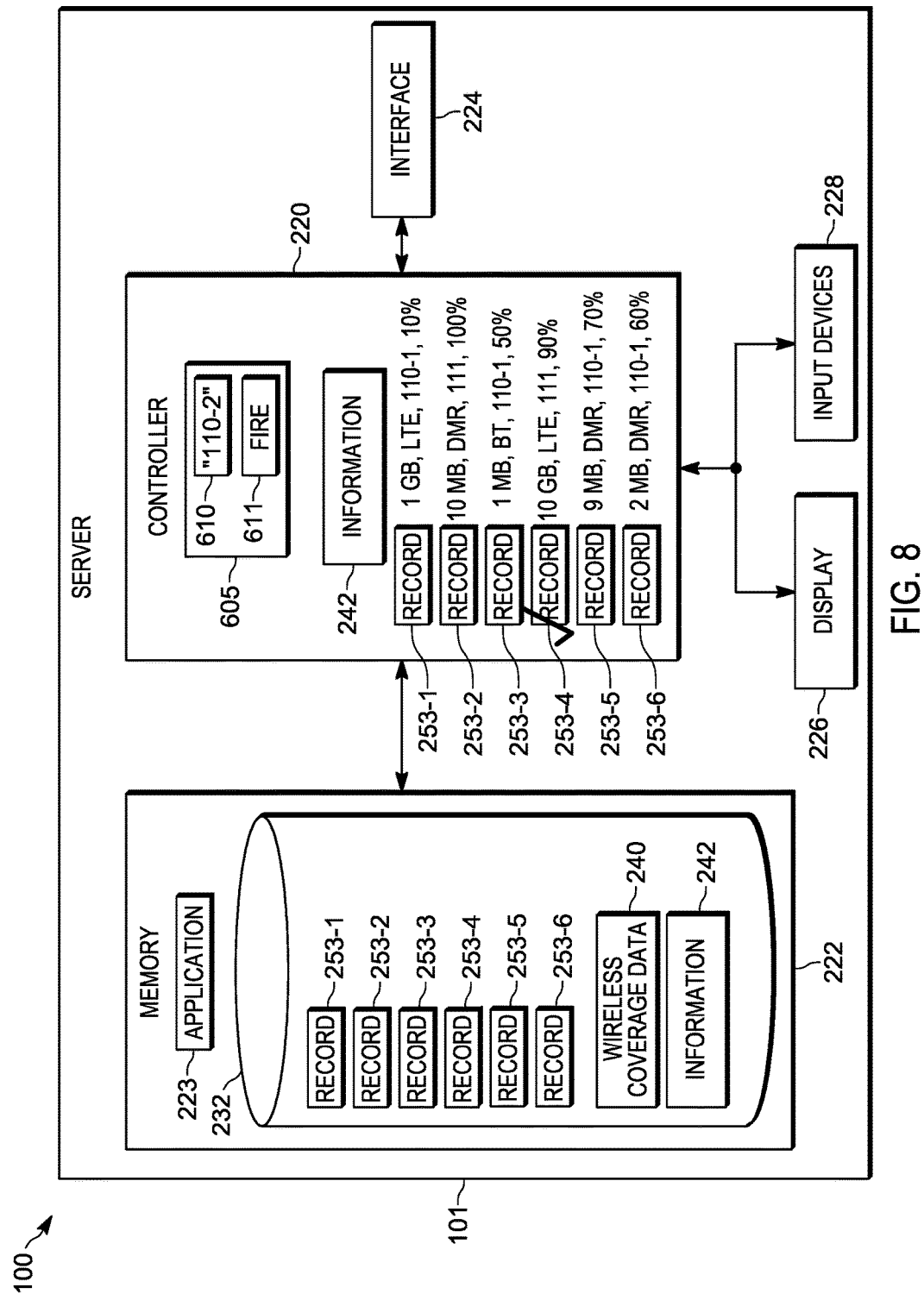
FIG. 8 depicts the server identifying a data carrier device that is capable of transporting information to the location identified in the incident report in accordance with some embodiments.

Attention is next directed to FIG. 8, which is substantially similar to FIG. 7, with like elements having like numbers. At FIG. 8, the controller 220 identifies (e.g. at the block 506 of the method 500) a data carrier device 103 that is capable of transporting the information 242 to the location and is one or more of: presently storing at least a portion of the information 242; and capable of downloading any portion of the information 242 that is not presently stored at the data carrier device 103.

For example, as depicted, the controller 220 may compare the information 242 to be transported to the location 110-2 (e.g. as indicated by the location 610) with the records 253, and specifically with the respective information portion (e.g. as indicated in the indication 342) at each of the records 253. While not depicted, the information 242 to be transported to the location 110-2 may also be compared with a record 253 of the device 603.

The controller 220 may further determine an amount of the information 242 that would need to be downloaded to each device 103 to complement the respective information portion 242 already stored thereupon, such that a device 103 could store all of the information 242.

The controller 220 may further determine various capabilities of each of the devices 103 (and the device 603) from the records 253. As depicted, each of the records 253 at the controller 220 is depicted adjacent information extracted from a respective record including, in order, a current memory capacity (e.g. in megabytes (MB) or gigabytes (GB)), a communication interface type (e.g. LTE, DMR, BT (Bluetooth™)), a current location (e.g. either location 110-1 or location 111), and a current battery capacity (e.g. in percent). The controller 220 may also determine a bandwidth, and the like, of a respective communication interface of each of the devices 103 to determine an amount of time that a device 103 may need to download the information 242 not already stored thereupon.

In other words, as depicted, the controller 220 may identify a data carrier device 103 that is capable of transporting the information to the location 110-2 by one or more of: comparing respective capabilities of a plurality of data carrier devices 103; and determining a closest data carrier device 103, of the plurality of data carrier devices 103, to the location 110-2.

Put another way, the controller 220 may identify the data carrier device 103 that is capable of transporting the information to the location 110-2 by comparing respective capabilities of the plurality of data carrier devices 103, wherein the respective capabilities of the plurality of data carrier devices 103 include one or more of: respective device bandwidth of the plurality of data carrier devices 103; a respective amount of the information stored at the plurality of data carrier devices 103 associated with the incident report; a respective battery state of the plurality of data carrier devices 103; a respective memory storage capacity of the plurality of data carrier devices 103; and respective sensors available to the plurality of data carrier devices 103.

In some embodiments (e.g. those pertaining to criminal and/or police incident scenes), the controller 220 may identify the data carrier device 103 that is capable of transporting the information to the location 110-2 by comparing respective capabilities of the plurality of data carrier devices 103, wherein the respective capabilities of the plurality of data carrier devices 103 include one or more of: a respective security strength of the plurality of data carrier devices 103; a respective storage security technique used to encrypt data of the plurality of data carrier devices 103 and the like. Such security capabilities may be considered when the information to be transported to the location 110-2 comprises private data, and/or data designated as sensitive and the like (such as criminal records). Indeed, in some of these implementations, a portion of the information 242 may be encrypted at least during transportation.

In any event, as depicted, the controller 220 has identified the device 103-4 (e.g. as visually indicated in FIG. 8 using a checkmark adjacent to the record 253-4) as the device 103 that is capable of transporting the information 242 to the location 110-2. For example, at the location 111, the device 103-4 may be closest to the location 110-2, as compared to the devices 103 at the location 110-1; and furthermore, as depicted, the record 253-4 indicates that the device 103-4 has the highest bandwidth (e.g. as a respective communication interface is an LTE interface), the highest memory capacity, and the highest battery capacity.

Where two or more devices 103 have similar capabilities, any suitable weighting scheme may be used to select between the devices 103, with higher weight, in some embodiments, being given to memory capacity and battery capacity. In other embodiments, devices 103 having the largest portion 442 of the information 242 are given higher weight.

Figure 9:
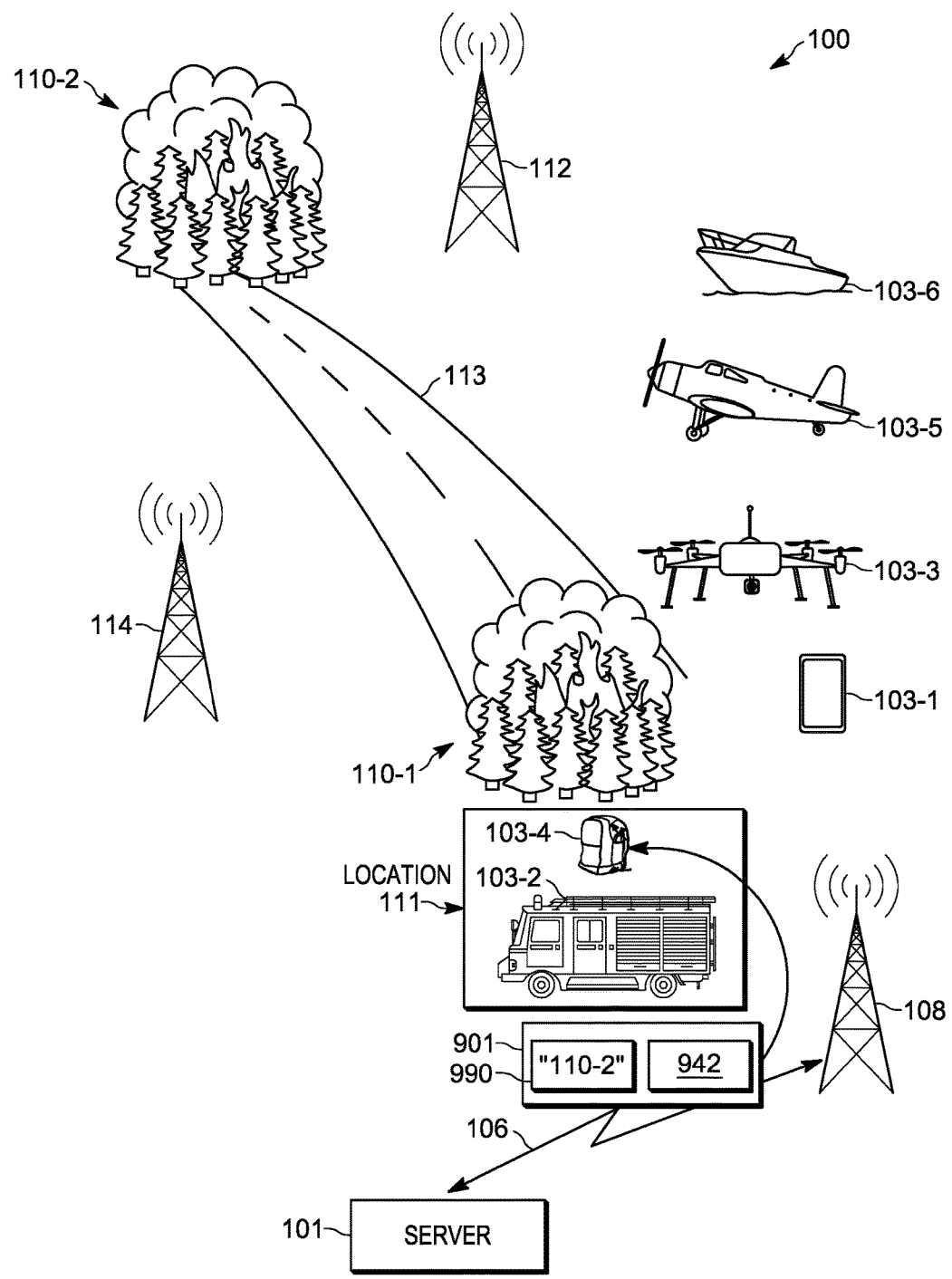
FIG. 9 depicts a dispatch command being transmitted to a data carrier device that is capable of transporting information to the location identified in the incident report in accordance with some embodiments.

Attention is next directed to FIG. 9 which is substantially similar to FIG. 6, with like elements having like numbers. At FIG. 9, the controller 220 transmits (e.g. at the block 508 of the method 500), using the communication interface 224, a dispatch command 901 to the data carrier device 103-4 to travel to the location 110-2; and an indication 942 of the information 242 to be transported to the location 110-1. As depicted, the dispatch command 901 comprises the indication 942 as well as an indication 990 of the location 110-2 (e.g. similar to the location 610) to which the device 103-4 is to be physically transported. In other words, the dispatch command 901 instructs the device 103-4 that it is to transport information indicated by the indication 942 to the location 110-4.

As depicted, the indication 942 of the information 242 to be transported to the location 110-2 may comprise one or more of: a respective portion of the information 242 to be transported; instructions for acquiring the information 242 to be transported; and a storage location of the information 242 to be transported.

For example, the indication 942 may comprise the portion of the information 242 that is not stored in the information portion 442 at the device 103-4.

Alternatively, the indication 942 may comprises instructions for acquiring the information 242 including, but not limited to, one or more of: instructions to download a portion of the information 242; and instructions for acquiring a portion the information 242 using one or more sensors 470 at the device 103. The device 103-4 then implements the instructions using the controller 420 and/or the interface 424 and/or one or more sensors 470. In some embodiments, the controller 220 may determine, from the records 253, the data sensing capabilities of each of the devices 103, including, but not limited to, respective sensor types and respective data acquisition rates and the like; hence, the controller 220 may generate from the data sensing capabilities, and further determine an amount of time that a device 103 may need to acquire the information 242 (e.g. via respective sensors) not already stored thereupon. Hence, in some embodiments, one or more of the devices 103 are capable of acquiring at least a portion of the information 242 to be transported to the location 110-2 (e.g. information not already stored at the devices 103), using respective sensors.

Furthermore, in some embodiments, a portion of the information 242 may be encrypted. Hence, in these embodiments, the indication 942 may include instructions for decrypting an encrypted portion of the information 242 to be transported.

Alternatively, the indication 942 may include a storage location of the information 242 to be transported including, but not limited to, a link to the information 242 as stored at the database 232; in these embodiments, the link may comprise a browser-type link, and the like. Furthermore, the device 103-4 may request the portion of the information 242 not currently stored at the device 103-4 using the link.

Figure 10:
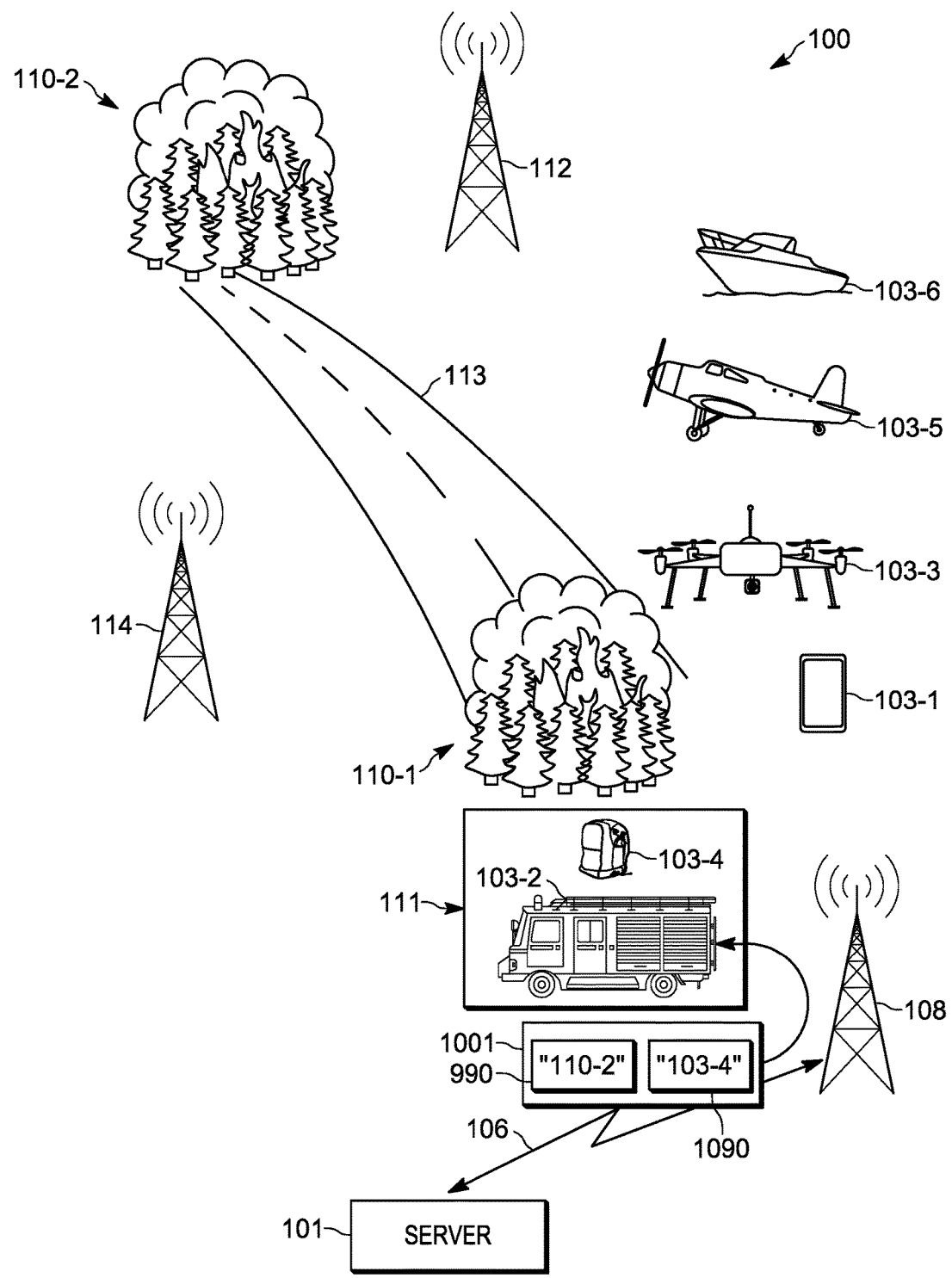
FIG. 10 depicts a dispatch command being transmitted to a vehicle to cause the vehicle to physically transport the data carrier device that to the location in accordance with some embodiments.

Attention is next directed to FIG. 10 which is substantially similar to FIG. 9, with like elements having like numbers. As the device 103-4 is a deployable backpack and not a vehicle (e.g. as determined by the server 101, and/or the controller 220, from the record 253-4), in some embodiments the server 101, and/or the controller 220, issues a further dispatch command 1001 to a vehicle in the similar location as the device 103-4 (as also determined from the records 253), for example the device 103-2. The dispatch command 1001 includes the indication 990 of the location to which the device 103-4 is to be physically transported, and identifier 1090 of the device 103-4 that is to be physically transported to the location 110-2. While not depicted, the dispatch command 901 transmitted to the device 103-4 may also include an identifier of the vehicle that is to be used to physically transport the device 103-4 to the location 110-2.

The embodiments described with reference to in FIG. 10 are understood to be optional, and any process for causing the device 103-4 to be physically transported to the location 110-2 are within the scope of the present specification. For example, when the device 103 to be physically transported to the location 110-2 is a vehicle, the dispatch command 901 may be sufficient to cause a driver of the vehicle to drive the vehicle to the location 110-2. Alternatively, when the device 103 to be physically transported to the location 110-2 is a drone, the drone may automatically physically transport the information 242 to the location 110-2 without a driver.

Figure 11:
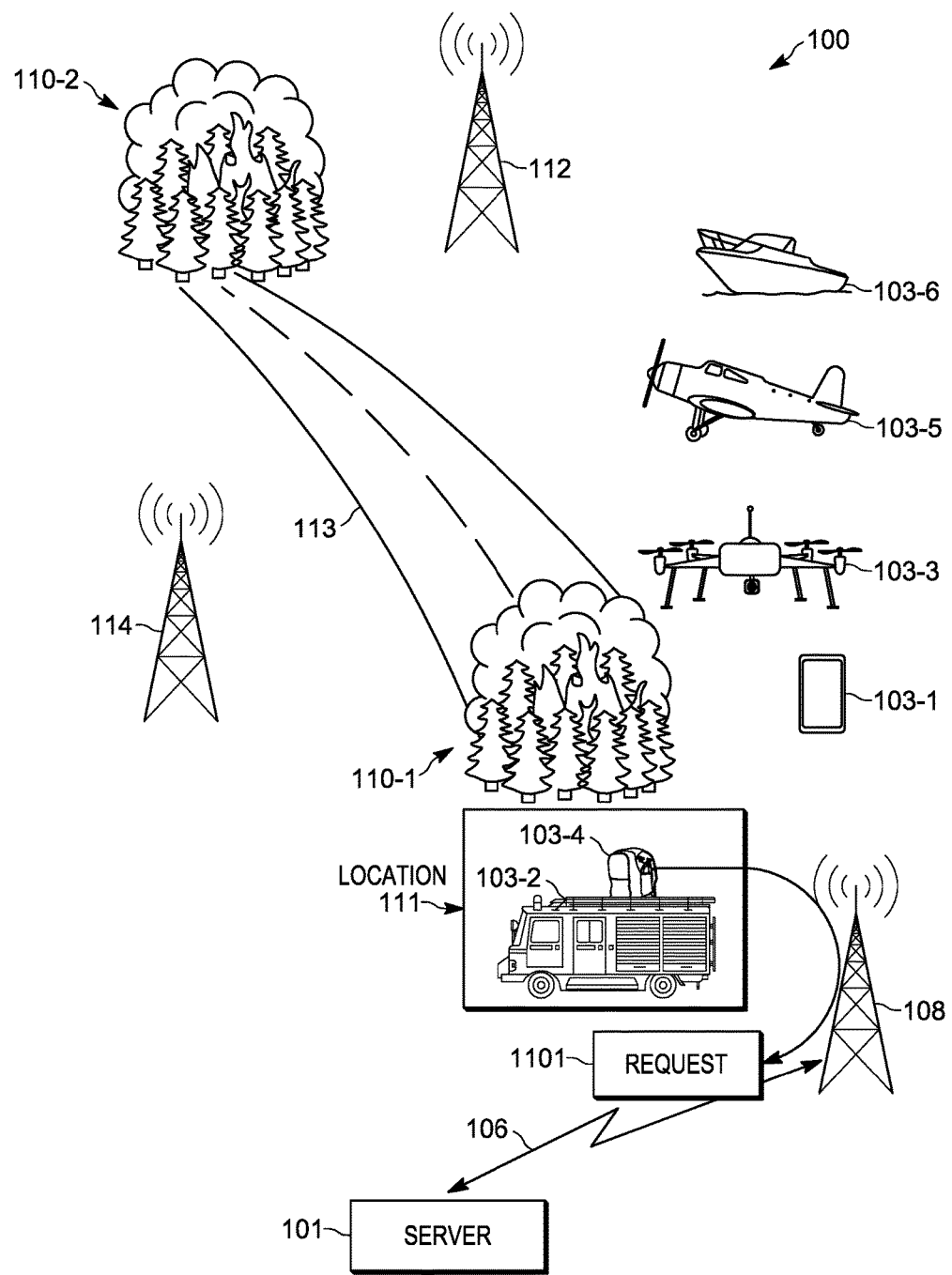
FIG. 11 depicts the data carrier device requesting information to be physically transported to the location in accordance with some embodiments.

Attention is next directed to FIG. 11 which is substantially similar to FIG. 10, with like elements having like numbers. In FIG. 11, the device 103-4 has been loaded onto the device 103-2 in preparation for physical transport to the location 110-2. In other words, instructions for implementing the dispatch commands 901, 1001 have been provided at each of the devices 103-2, 103-4 to cause a driver to load the device 103-4 onto the device 103-2. For example, a display device 426 at one or more of the devices 103-2, 103-4 may provide instructions for loading the device 103-2 onto the device 103-4 and the location 110-2 to which the device 103-2 is to be transported.

Figure 12:
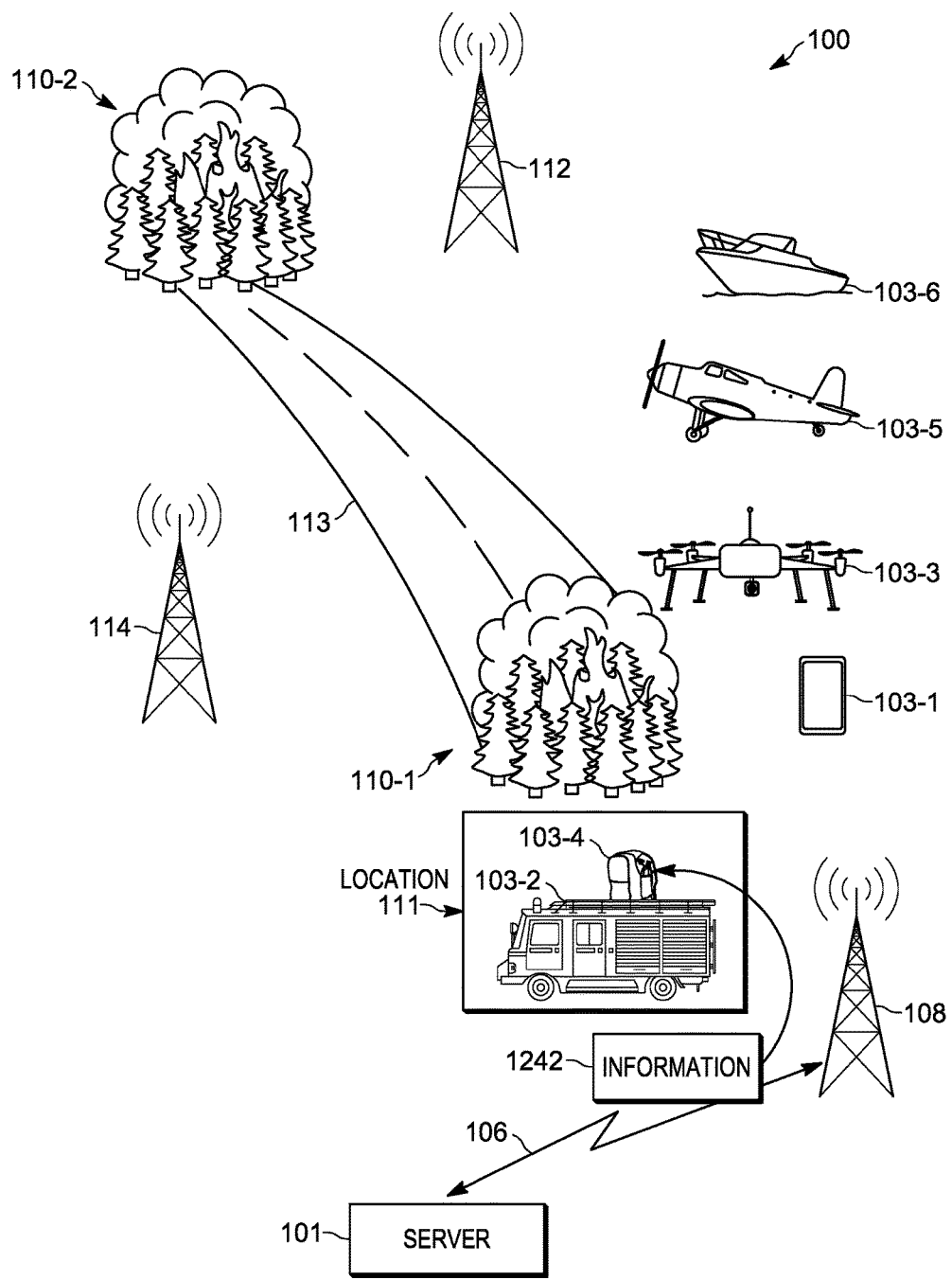
FIG. 12 depicts the information being transmitted to the data carrier device in accordance with some embodiments.

As further depicted in FIG. 11, the device 103-4 transmits a request 1101 to the server 101 (and/or any other device storing the information, as indicated in the dispatch command 901), for the portion of the information 242 not presently stored by the device 103-4. Then, as depicted in FIG. 12, which is substantially similar to FIG. 11, with like elements having like numbers, the server 101 transmits the requested information 1242 to the device 103-4 for storage thereupon. When the requested information 1242 is received, the device 103-4 stores the requested information 1242, for example at the memory 422. If the dispatch command 901 further included instructions to acquire information using sensors of the device 103-4, the device 103-4 may also acquire such data.

Figure 13:
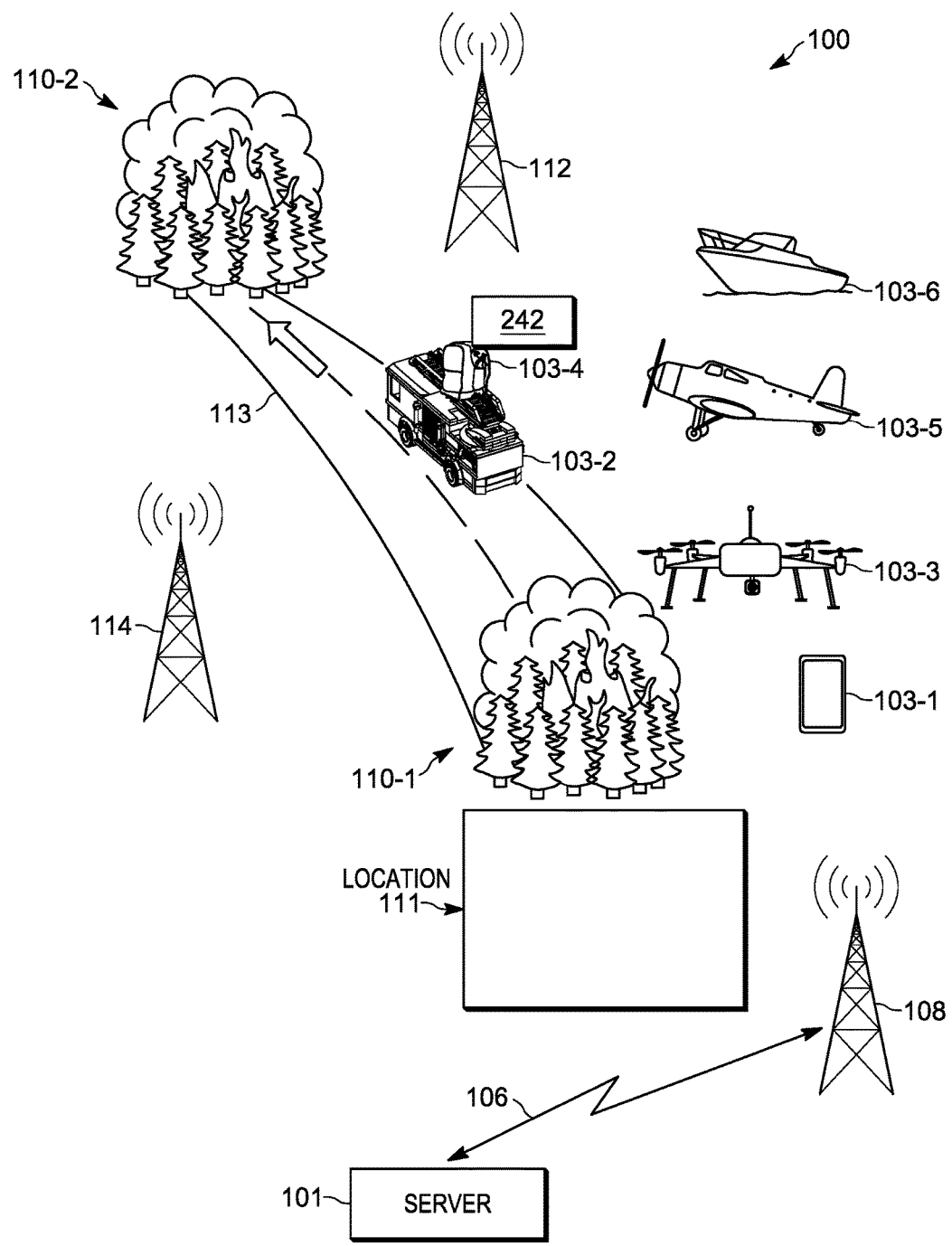
FIG. 13 depicts the data carrier device being physically transported to the location identified in the incident report in accordance with some embodiments.

Attention is next directed to FIG. 13, which is substantially similar to FIG. 12, with like elements having like numbers. In FIG. 13, the device 103-4 is being physically transported by the device 103-2 to the location 110-2, for example using the path 113, and furthermore the information 242 is stored at the device 103-4. When the device 103-4 arrives at the location 110-2, the information 242 may be accessed using computing devices and the like at the location 110-2 (e.g. computing devices used by first responders) to assist in fighting the fire at the location 110-2. For example, when the device 103-4 includes a memory, a removable memory, and the like, that stores the information 242, the information 242 may be accessed by connecting the memory with a computing device at the location 110-2 and/or by communicatively coupling the computing device at the location 110-2 with the device 103-4 (e.g. using a local wired and/or wireless connection). Hence, the information 242 may be accessed whether the location 110-2 has wireless coverage, limited wireless coverage and/or no wireless coverage.

Hence, provided herein is a method and device for dispatching data carrier devices, for example to incident locations that have limited and/or no wireless coverage. Data carrier devices capable of transporting information to an incident location are identified based on whether they presently store at least a portion of the information; and are capable of downloading any portion of the information that is not presently stored at the data carrier device. A data carrier device is then dispatched to the incident location. Any of the information that the data carrier device does not presently store is acquired by the data carrier device, either at its current location or in route. In this manner problems in accessing data at the incident location, due to limited wireless coverage, may be mitigated.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device comprising:
a communication interface; and a controller configured to:
receive, using the communication interface, an incident report including a location of an associated incident;
determine, from the incident report, that the location has limited wireless coverage;
determine, from the incident report, information to be physically transported to the location of the associated incident by a vehicle physically transporting a data carrier device storing the information;
identify the data carrier device that is capable of physically transporting the information to the location and is one or more of: presently storing at least a portion of the information prior to being physically transported to the location; and capable of downloading any portion of the information that is not presently stored at the data carrier device, the downloading occurring one or more of: prior to being physically transported to the location by the vehicle; and during physical transportation of the data carrier device to the location; and
transmit, using the communication interface, a dispatch command to the data carrier device to travel to the location; and an indication of the information to be transported to the location.

2. The device of claim 1, wherein the controller is further configured to access a memory that stores one or more of: wireless coverage data associated with the location; a respective location of the data carrier device, capabilities of the data carrier device; and a storage location of the information.

3. The device of claim 2, wherein the controller is further configured to determine, from the memory, one or more of the limited wireless coverage of the location, the respective location of the data carrier device, the capabilities of the data carrier device, and the storage location of the information.

4. The device of claim 1, wherein the incident report includes a respective indication of the information that is to be transported to the location.

5. The device of claim 1, wherein the controller is further configured to identify the data carrier device by one or more of: comparing respective capabilities of a plurality of data carrier devices; and determining a closest data carrier device, of the plurality of data carrier devices, to the location.

6. The device of claim 5, wherein the controller is further configured to identify the data carrier device by comparing respective capabilities of a plurality of data carrier devices, wherein the respective capabilities of the plurality of data carrier devices include one or more of: respective device bandwidth of the plurality of data carrier devices; a respective amount of the information stored at the plurality of data carrier devices associated with the incident report; a respective battery state of the plurality of data carrier devices; a respective memory storage capacity of the plurality of data carrier devices; respective sensors available to the plurality of data carrier devices; respective security strength of the plurality of data carrier devices; and respective storage security techniques used to encrypt data at the plurality of data carrier devices.

7. The device of claim 1, wherein the information to be transported includes one or more of: data associated with the location, data associated with the incident report, weather at the location, wind direction at the location, wind speed at the location, a microclimate of the location, soil moisture at the location, a map of the location, topography of the location, chemicals at the location, materials at the location, personnel at the location, status of the personnel at the location, a fire perimeter at the location, commands to be implemented at the location, directives to be implemented at the location, status of personnel at another location, and criminal data associated with the location.

8. The device of claim 1, wherein the indication of the information to be transported to the location comprises one or more of: a respective portion of the information to be transported; instructions for acquiring the information to be transported; a storage location of the information to be transported; and instructions for decrypting an encrypted portion of the information to be transported.

9. The device of claim 1, further comprising a computer aided dispatch device configured to provide the information to be transported.

10. The device of claim 1, wherein the data carrier device comprises one or more of the vehicle, a wireless communication device, a drone, a boat, an aircraft, and a deployable backpack.

11. A method comprising:
receiving, at a controller, using a communication interface, an incident report including a location of an associated incident;
determining, at the controller, from the incident report, that the location has limited wireless coverage;
determining, at the controller, from the incident report, information to be physically transported to the location of the associated incident by a vehicle physically transporting a data carrier device storing the information;
identifying, at the controller, the data carrier device that is capable of transporting the information to the location and is one or more of: presently storing at least a portion of the information prior to being physically transported to the location; and capable of downloading any portion of the information that is not presently stored at the data carrier device, the downloading occurring one or more of: prior to being physically transported to the location by the vehicle; and during physical transportation of the data carrier device to the location; and
transmitting, from the controller, using the communication interface, a dispatch command to the data carrier device to travel to the location, and an indication of the information to be transported to the location.

12. The method of claim 11, further comprising accessing, at the controller, a memory that stores one or more of: wireless coverage data associated with the location; a respective location of the data carrier device, capabilities of the data carrier device; and a storage location of the information.

13. The method of claim 12, further comprising determining, at the controller, from the memory, one or more of the limited wireless coverage of the location, the respective location of the data carrier device, the capabilities of the data carrier device, and the storage location of the information.

14. The method of claim 11, wherein the incident report includes a respective indication of the information that is to be transported to the location.

15. The method of claim 11, further comprising identifying, at the controller, the data carrier device by one or more of: comparing respective capabilities of a plurality of data carrier devices; and determining a closest data carrier device, of the plurality of data carrier devices, to the location.

16. The method of claim 15, further comprising identifying, at the controller, the data carrier device by comparing respective capabilities of a plurality of data carrier devices, wherein the respective capabilities of the plurality of data carrier devices include one or more of: respective device bandwidth of the plurality of data carrier devices; a respective amount of the information stored at the plurality of data carrier devices associated with the incident report; a respective battery state of the plurality of data carrier devices; a respective memory storage capacity of the plurality of data carrier devices; respective sensors available to the plurality of data carrier devices; respective security strength of the plurality of data carrier devices; and respective storage security techniques used to encrypt data at the plurality of data carrier devices.

17. The method of claim 11, wherein the information to be transported includes one or more of: data associated with the location, data associated with the incident report, weather at the location, wind direction at the location, wind speed at the location, a microclimate of the location, soil moisture at the location, a map of the location, topography of the location, chemicals at the location, materials at the location, personnel at the location, status of the personnel at the location, a fire perimeter at the location, commands to be implemented at the location, directives to be implemented at the location, status of personnel at another location, and criminal data associated with the location.

18. The method of claim 11, wherein the indication of the information to be transported to the location comprises one or more of: a respective portion of the information to be transported; instructions for acquiring the information to be transported; a storage location of the information to be transported; and instructions for decrypting an encrypted portion of the information to be transported.

19. The method of claim 11, further comprising receiving, at the controller, from a computer aided dispatch device, at least a portion of the information to be transported.

20. The method of claim 11, wherein the data carrier device comprises one or more of the vehicle, a wireless communication device, a drone, a boat, an aircraft, and a deployable backpack.

* * * * *